(12) United States Patent
Chang et al.

(10) Patent No.: US 12,321,550 B2
(45) Date of Patent: Jun. 3, 2025

(54) SIGNAL PROCESSING METHOD AND RELATED CIRCUIT HAVING BACKUP PROCESSING CIRCUIT

(71) Applicant: HIMAX TECHNOLOGIES LIMITED, Tainan (TW)

(72) Inventors: Yaw-Guang Chang, Tainan (TW); Jia-Ming He, Tainan (TW); Yi-Yang Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/375,554

(22) Filed: Oct. 2, 2023

(65) Prior Publication Data

US 2025/0110590 A1 Apr. 3, 2025

(51) Int. Cl.
*G06F 3/041* (2006.01)
(52) U.S. Cl.
CPC .................................. *G06F 3/0418* (2013.01)
(58) Field of Classification Search
CPC .................................................... G06F 3/0418
See application file for complete search history.

(56) References Cited

U.S. PATENT DOCUMENTS

| 8,386,862 | B2 | 2/2013 | Terae | |
| 2012/0293455 | A1* | 11/2012 | Shen | G06F 3/047 |
| | | | | 345/174 |
| 2015/0205408 | A1 | 7/2015 | Tsai | |
| 2018/0188879 | A1 | 7/2018 | Lin | |

FOREIGN PATENT DOCUMENTS

| CN | 108268162 A | 7/2018 |
| TW | 201523406 A | 6/2015 |
| TW | 201619791 A | 6/2016 |

\* cited by examiner

*Primary Examiner* — Gustavo Polo
(74) *Attorney, Agent, or Firm* — Winston Hsu

(57) ABSTRACT

A circuit, for a touch panel, comprising N touch signal processing circuits; a backup processing circuit; and a controller, coupled to the N touch signal processing circuits and the backup processing circuit, configured to determine whether one of the N touch signal processing circuits is failed and generate a determining result, and control the N touch signal processing circuits and the backup processing circuit to process N touch signals received from the touch panel to obtain N digital signals according to the determining result.

8 Claims, 6 Drawing Sheets

SIGNAL PROCESSING METHOD AND RELATED CIRCUIT HAVING BACKUP PROCESSING CIRCUIT

BACKGROUND OF THE INVENTION

1. Field of the Invention

The present invention relates to a signal processing method and a related circuit for a touch panel, and more particularly, to a signal processing method and a related circuit having a backup processing circuit.

2. Description of the Prior Art

Electronic circuits may be compromised by various factors such as electrostatic discharge, semiconductor process yield, etc. These factors may not cause the entire circuit to fail, but can lead to the malfunction of critical components, rendering the whole circuit ineffective. Consequently, the industry is striving to find ways to restore the functionality of the entire electronic circuits when only a part of critical components fail.

SUMMARY OF THE INVENTION

The present invention is to provide a signal processing method and a related circuit to solve the above problems.

An embodiment of the present invention provides a circuit, for a touch panel, comprising N touch signal processing circuits; a backup processing circuit; and a controller, coupled to the N touch signal processing circuits and the backup processing circuit, configured to determine whether one of the N touch signal processing circuits is failed and generate a determining result, and control the N touch signal processing circuits and the backup processing circuit to process N touch signals received from the touch panel to obtain N digital signals according to the determining result.

An embodiment of the present invention provides a touch signal processing method, for a circuit used for a touch panel, comprising determining whether one of N touch signal processing circuits of the circuit is failed and generating a determining result; controlling the N touch signal processing circuits and a backup processing circuit of the circuit to process N touch signals received from the touch panel to obtain N digital signals according to the determining result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
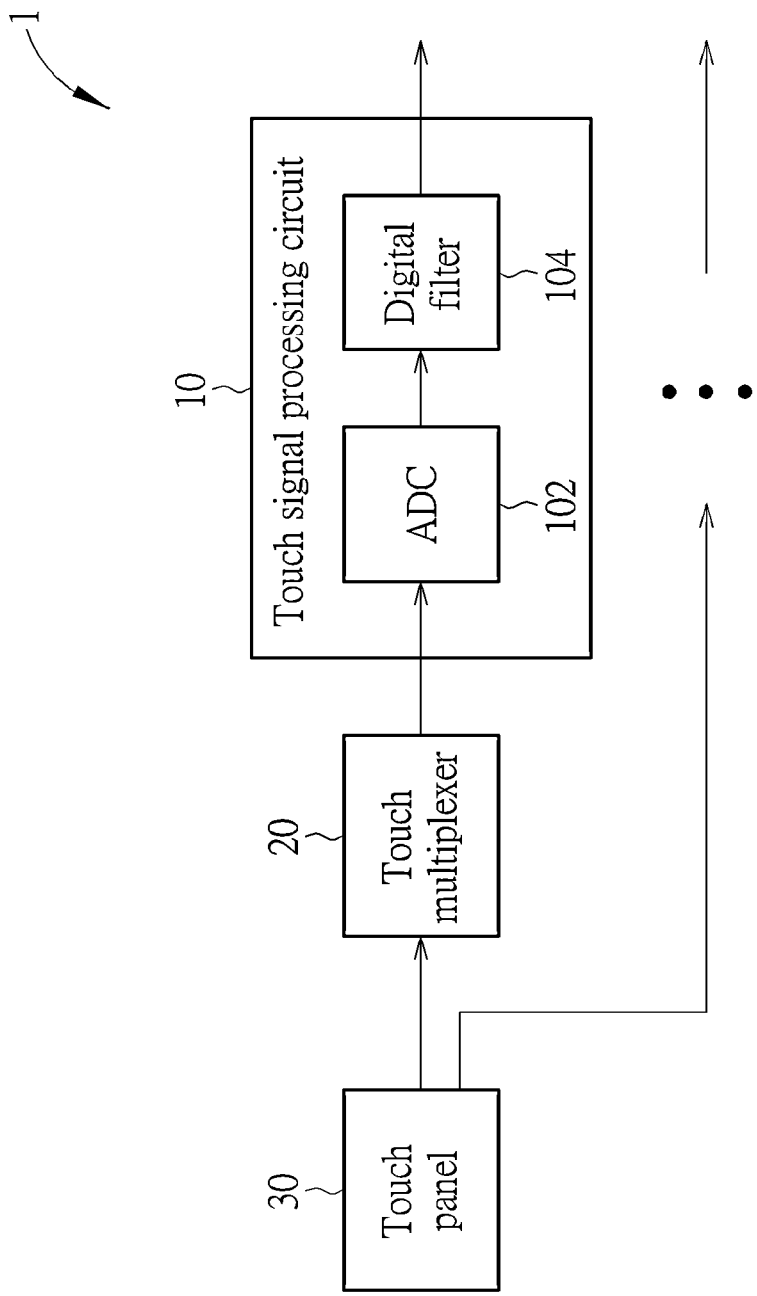
FIG. 1 is a simplified schematic diagram of a conventional touch system.

Please refer to FIG. 1. FIG. 1 is a simplified schematic diagram of a conventional touch system 1. The touch system 1 includes a plurality of touch signal processing circuits 10, a plurality of touch multiplexers 20 and a touch panel 30. The touch panel 30 is used to receive analog touch signals such as user's touches, gestures, etc. on a touch interface of the touch panel 30. The plurality of touch signal processing circuits 10 are coupled to the touch panel 30 to receive and process the analog touch signals through the plurality of touch multiplexers 20. Specifically, each of the touch signal processing circuits 10 includes an analog to digital convertor (ADC) 102 and a digital filter 104. The analog touch signals are input to the ADCs 102 of the plurality of touch signal processing circuits 10 and converted into digital touch signals. Finally, noises in the digital touch signals are filtered out through the digital filters 104 of the plurality of touch signal processing circuits 10 for subsequent operations.

It should be noted that the conventional touch system 1 may not function properly as long as one of the plurality of touch signal processing circuits 10 fails, for example, when one of the ADCs 102 and the digital filters 104 fails, or a short circuit/break occurs in the connections between the ADC 102 and the digital filter 104 or various components such as the touch multiplexer. In order to improve the shortcomings of the conventional touch system 1, the present invention adds a backup processing circuit that is identical to or matches any one of the plurality of touch signal processing circuits 10.

Figure 2:
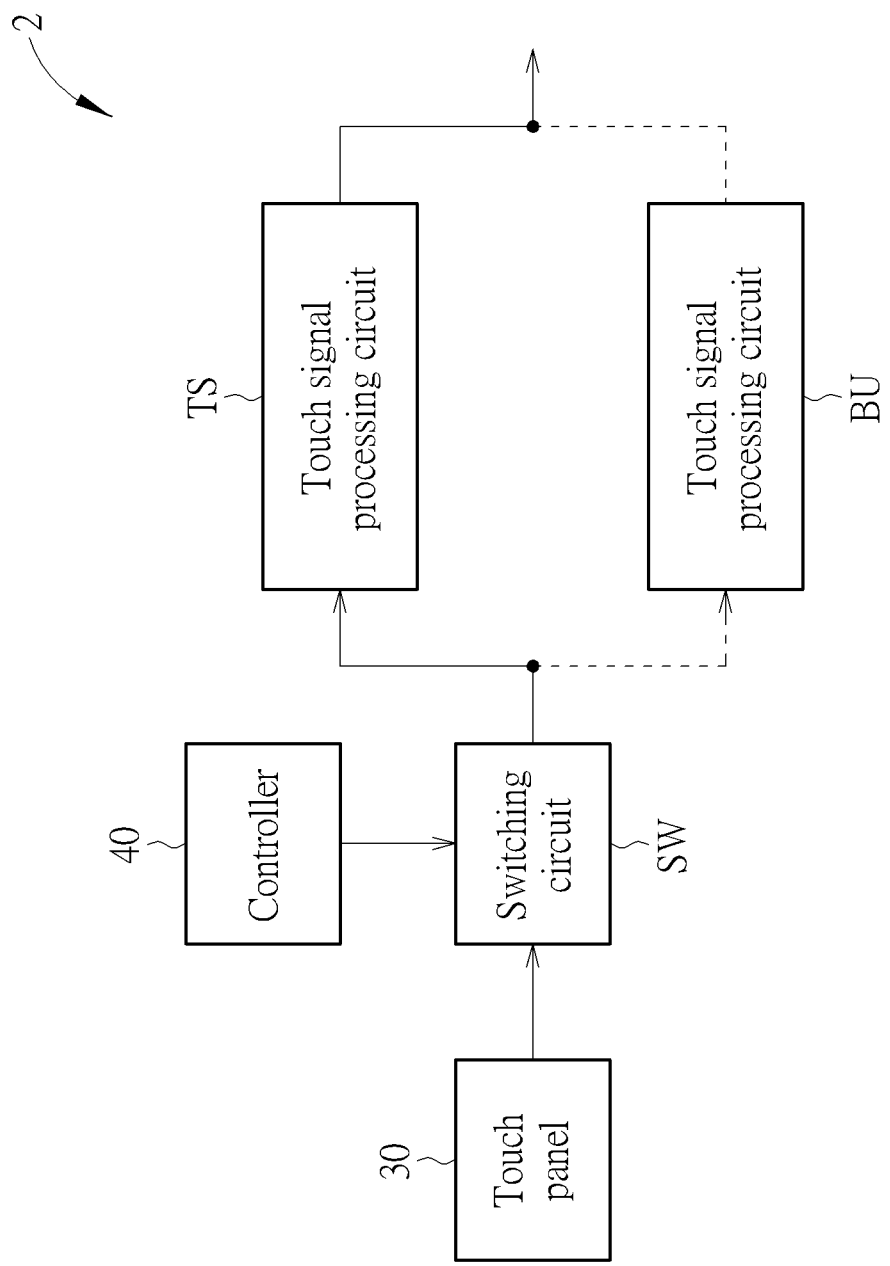
FIG. 2 is a schematic diagram of a touch system according to an embodiment of the present invention.

In detail, please refer to FIG. 2. FIG. 2 is a schematic diagram of a touch system 2 according to an embodiment of the present invention. The touch system 2 is derived from the conventional touch system 1, so the elements are represented by the same symbols. For the sake of brevity, FIG. 2 illustrates a touch signal processing circuit TS of the touch system 2 as a representative of the plurality of touch signal processing circuits for processing analog touch signals from the touch panel 30. In addition, the touch system 2 further includes a backup processing circuit BU identical to the touch signal processing circuit TS, and a controller 40. The controller 40 may determine whether the touch signal processing circuit TS is failed and generate a determining result, and control the touch signal processing circuit TS and the backup processing circuit BU to process the analog touch signal according to the determining result. In an embodiment, in an event that the determining result indicates that the touch signal processing circuit TS is not failed, the controller 40 disables the backup processing circuit BU and controls the touch signal processing circuit TS to process the analog touch signals to obtain a digital signal. In another embodiment, in an event that the determining result indicates that the touch signal processing circuit TS is failed, the controller 40 disables the touch signal processing circuit TS and controls the backup processing circuit BU to process the analog touch signals to obtain a digital signal.

In short, in the touch system 2, when the touch signal processing circuit TS is failed, the backup processing circuit BU may replace the touch signal processing circuit TS to process the analog touch signals. In order to achieve the above replacement operation, the touch system 2 may additionally include a switching circuit SW for switching the touch signal processing circuit TS and the backup processing circuit BU. It should be noted that, the touch multiplexer may add a switching function, which is represented by the switching circuit SW in FIG. 2.

Figure 3:
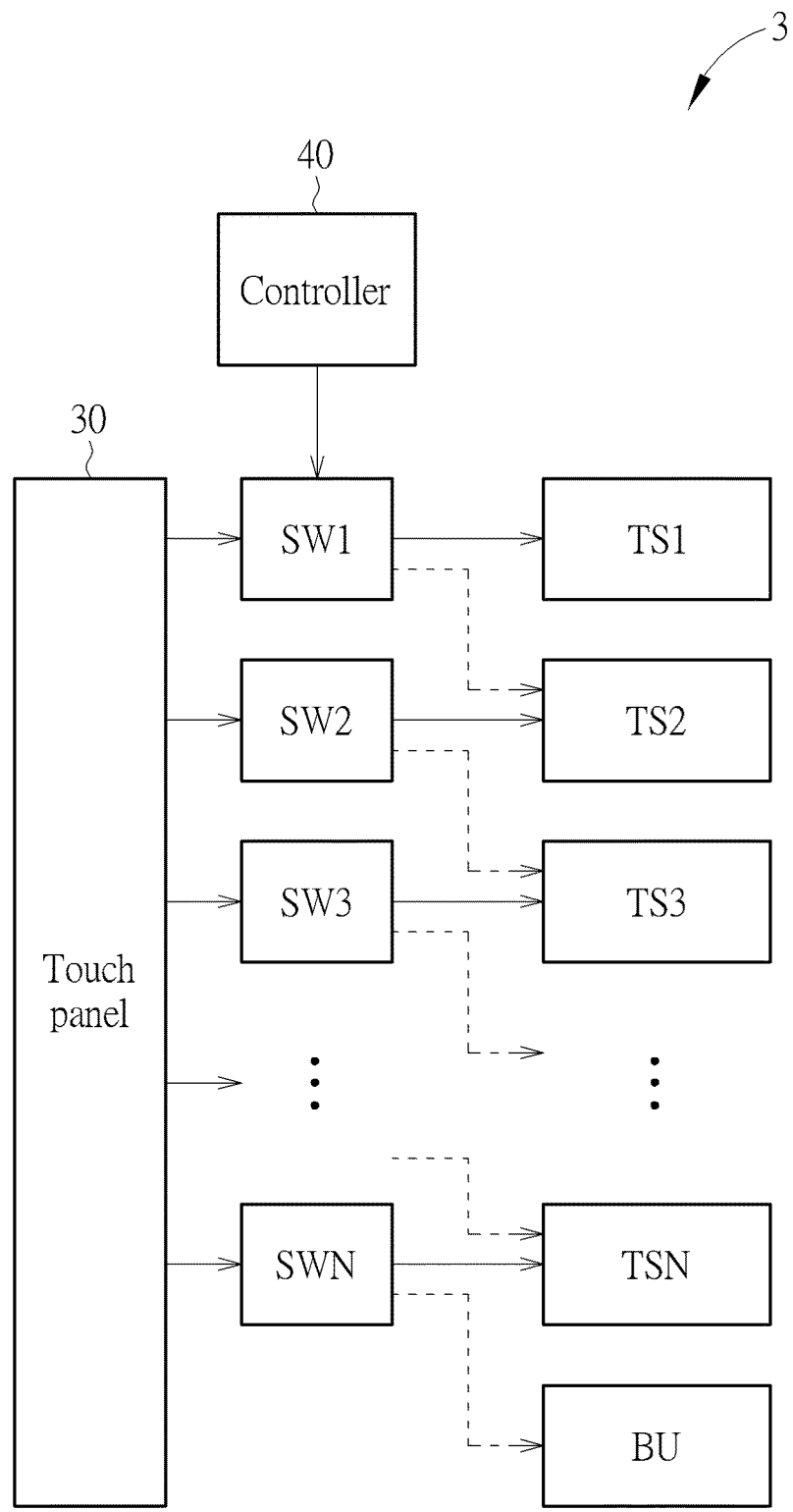
FIG. 3 and FIG. 4 illustrate a schematic diagram of a touch system according to an embodiment of the present invention.
Figure 4:
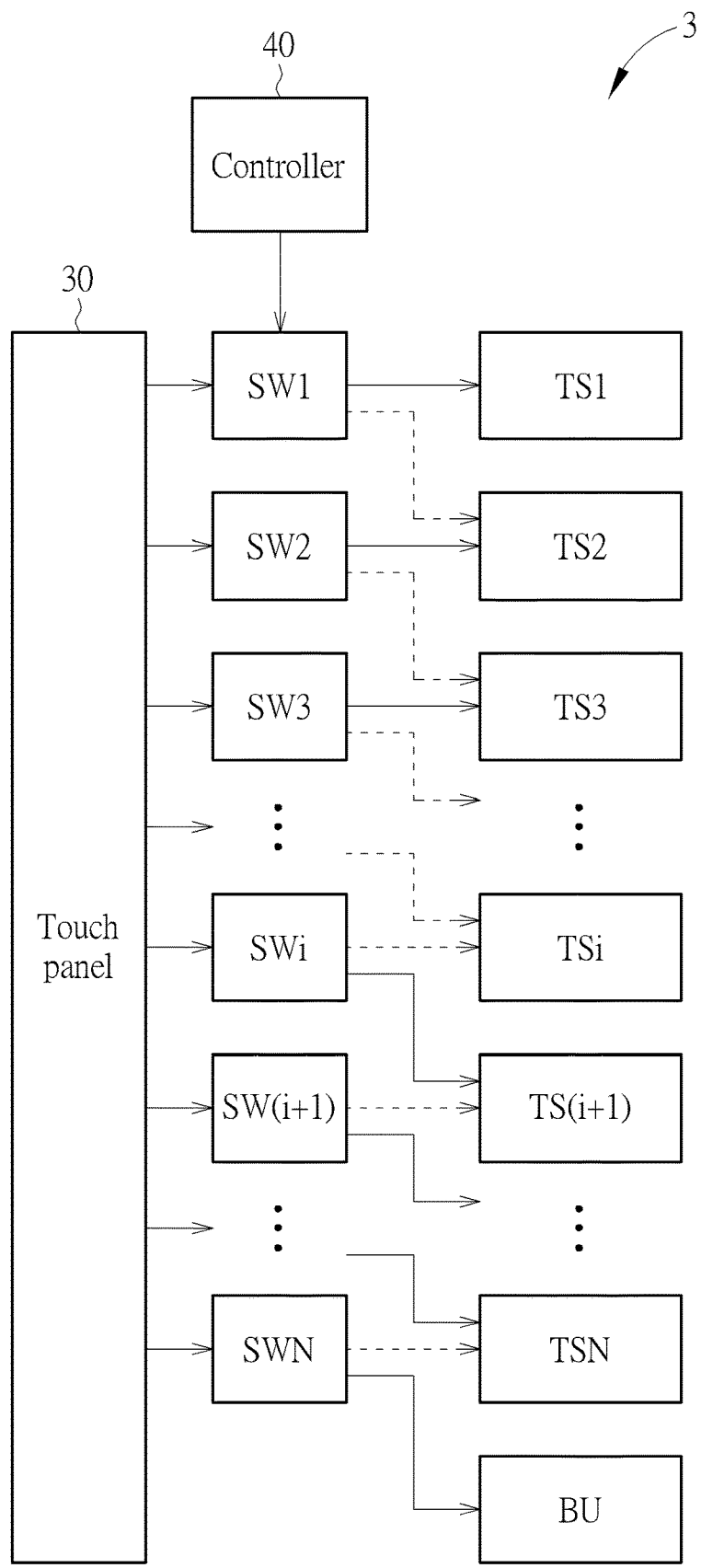

In a detailed embodiment, please refer to FIG. 3 and FIG. 4. FIG. 3 and FIG. 4 illustrate schematic diagrams of a touch system 3 according to an embodiment of the present invention. The touch system 3 includes N touch signal processing circuits TS1-TSN, the backup processing circuit BU, N switching circuits SW1-SWN, the controller 40 and the touch panel 30. The controller 40 may determine whether one of the N touch signal processing circuits TS1-TSN is failed and generate the determining result. As shown in FIG. 3, in an event that the determining result indicates that the N touch signal processing circuits TS1-TSN are not failed, the controller 40 disables the backup processing circuit BU and controls the N touch signal processing circuits TS1-TSN to receive N analog touch signals through the N switching circuits SW1-SWN respectively and to process the N analog touch signals to obtain N digital signals. On the other hand, as shown in FIG. 4, in an event that the determining result indicates that an M-th touch signal processing circuit TSM of the N touch signal processing circuits is failed, the controller 40 disables the M-th touch signal processing circuit TSM and enables the backup processing circuit BU, and controls the backup processing circuit BU and the N touch signal processing circuits TS1-TSN except the M-th touch signal processing circuit TSM to receive N analog touch signals through the N switching circuits SW1-SWN respectively and to process the N analog touch signals to obtain N digital signals.

In detail, the controller 40 controls an M-th switching circuit SWM of the N switching circuits switches SW1-SWN to connect to the M-th touch signal processing circuit TSM or an (M+1)-th touch signal processing circuit TS (M+1) of the N touch signal processing circuits TS1-TSN, and controls an N-th switching circuit SWN of the N switching circuits switches to connect to an N-th touch signal processing circuit TSN of the N touch signal processing circuits TS1-TSN or the backup processing circuit BU, wherein M is smaller than N. As shown in FIG. 3, in an event that the determining result indicates that the N touch signal processing circuits TS1-TSN are not failed, the controller 40 controls the M-th switching circuit SWM to the M-th touch signal processing circuit TSM and controls the N-th switching circuit SWN to connect to the N-th touch signal processing circuit TSN, and the controller 40 controls the N touch signal processing circuits TS1-TSN to receive the N touch signals through the N switching circuits SW1-SWN from the touch panel 30 and process the N touch signals to obtain the N digital signals. On the other hand, as shown in FIG. 4, in an event that the determining result indicates that an i-th touch signal processing circuit TSi of the N touch signal processing circuits is failed, the controller 40 controls the M-th switching circuit SWM to connect to an (M+1)-th touch signal processing circuit TS (M+1) if M is smaller than N and larger than or equal to i, or controls the M-th switching circuit SWM to connect to the M-th touch signal processing circuit TSM if M is smaller than i, and controls the N-th switching circuit SWN to connect to the backup processing circuit BU, and the controller 40 controls the backup processing circuit BU and the N touch signal processing circuits TS1-TSN except the i-th touch signal processing circuit TSM to receive N analog touch signals through the N switching circuit SW1-SWN respectively and to process the N analog touch signals to obtain N digital signals.

Figure 5:
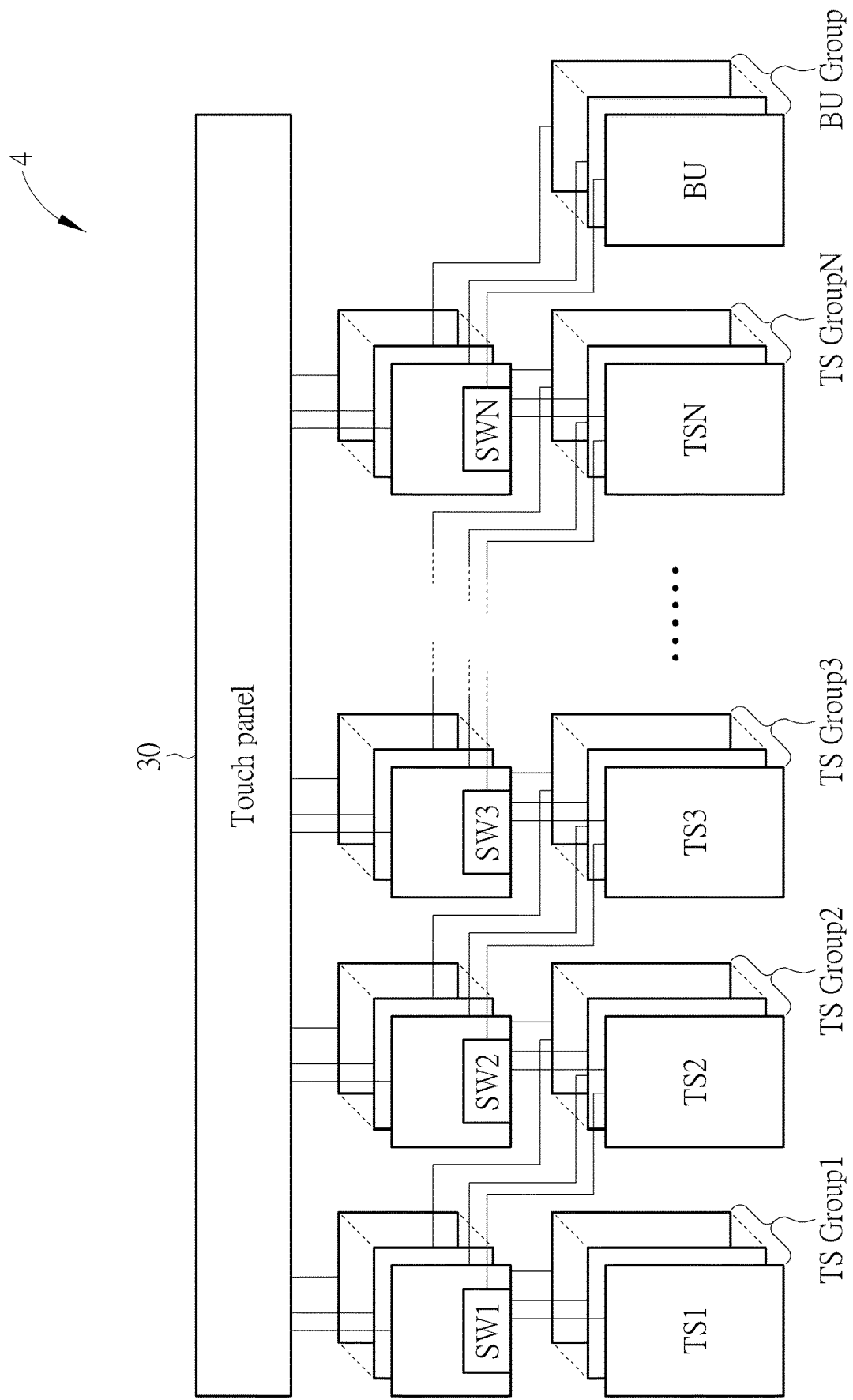
FIG. 5 is a schematic diagram of a touch system according to another embodiment of the present invention.

FIG. 3 and FIG. 4 illustrate possible implementations of the touch system of the present invention. The touch system of the present invention may include additional backup circuits. Those skilled in the art may change the connections between the switching circuit, the touch signal processing circuits and the backup circuits and are not limited thereto. In this way, the touch system may still operate properly when more touch signal processing circuits fail. For example, as shown in FIG. 5, a touch system 5 includes N touch signal processing circuit groups TSGroup1-TSGroupN and a backup processing circuit group BUGroup. When any touch signal processing circuit group within the N touch signal processing circuit groups TSGroup1-TSGroupN is failed, the backup processing circuit group BUGroup may replace the failed touch signal processing circuit group, such that the touch system 5 may work properly.

Figure 6:
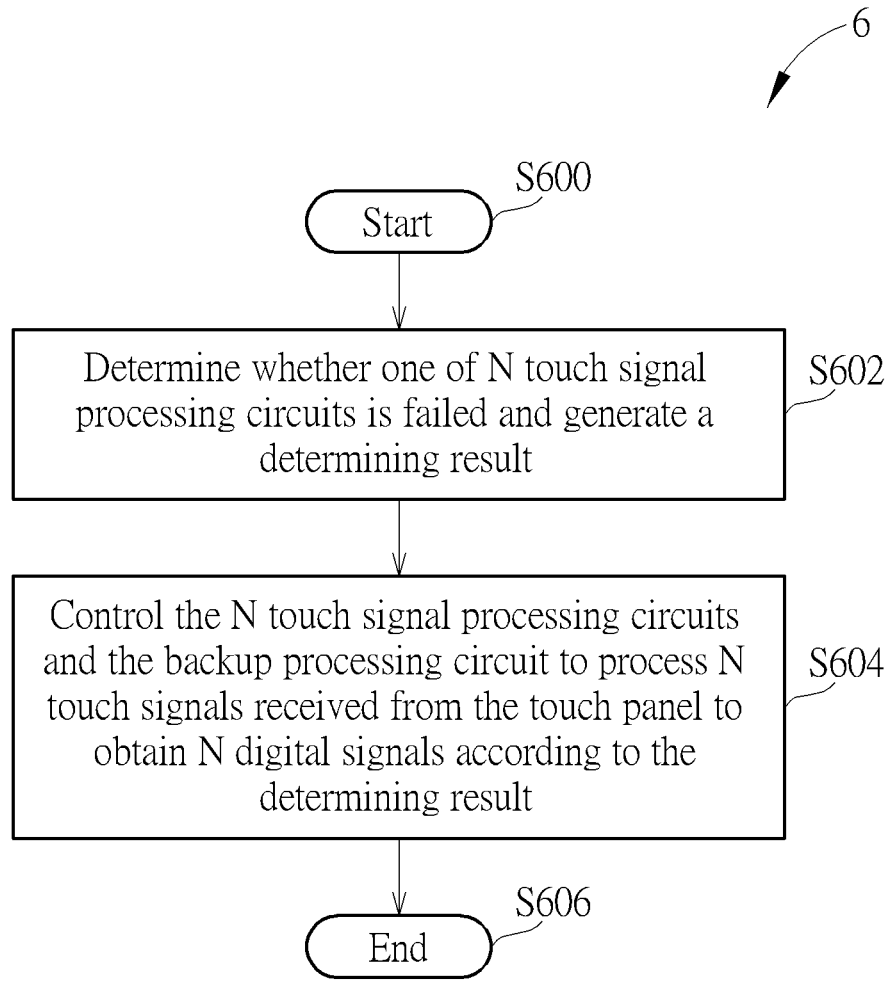
FIG. 6 is a flowchart of a touch signal processing method according to an embodiment of the present invention.

The operations of the touch systems 2-4 may be summarized as a touch signal processing method 6, as shown in FIG. 6. The touch signal processing method 6 includes the following steps:

Step S600: Start.

Step S602: Determine whether one of N touch signal processing circuits is failed and generate a determining result.

Step S604: Control the N touch signal processing circuits and the backup processing circuit to process N touch signals received from the touch panel to obtain N digital signals according to the determining result.

Step S606: End.

The detail descriptions and derivative changes of the touch signal processing method 6 are described as above, and will not repeated here.

In summary, the touch system and the touch signal processing method of the present invention replace the failed touch signal processing circuit with the backup processing circuit to ensure that the touch system may still operate properly when a part of the touch signal processing circuits fails.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit, for a touch panel, comprising:
  N touch signal processing circuits;
  a backup processing circuit; and
  a controller, coupled to the N touch signal processing circuits and the backup processing circuit, configured to determine whether one of the N touch signal processing circuits is failed and generate a determining result, and control the N touch signal processing circuits and the backup processing circuit to process N touch signals received from the touch panel to obtain N digital signals according to the determining result;

wherein each of the N touch signal processing circuits and the backup processing circuit are identical circuits;

wherein in an event that the determining result indicates that an M-th touch signal processing circuit of the N touch signal processing circuits is failed, the controller disables the M-th touch signal processing circuit of the N touch signal processing circuits and enables the backup processing circuit, and controls the backup processing circuit and the N touch signal processing circuits to process the N touch signals to obtain the N digital signals.

2. The circuit of claim 1, wherein in an event that the determining result indicates that the N touch signal processing circuits are not failed, the controller disables the backup processing circuit and controls the N touch signal processing circuits to process the N touch signals to obtain the N digital signals.

3. The circuit of claim 1, further comprising:

N switching circuits, coupled to the touch panel and the controller, wherein an M-th switching circuit of the N switching circuits switches to connect to an M-th or (M+1)-th touch signal processing circuit of the N touch signal processing circuits, and an N-th switching circuit of the N switching circuits switches to connect to an N-th touch signal processing circuit of the N touch signal processing circuits or the backup processing circuit;

wherein M is smaller than N.

4. The circuit of claim 3, wherein in an event that the determining result indicates that the N touch signal processing circuits are not failed, the controller controls the M-th switching circuit of the N switching circuits to connect to the M-th touch signal processing circuit of the N touch signal processing circuits and controls the N-th switching circuit of the N switching circuits to connect to the N-th touch signal processing circuit of the N touch signal processing circuits, and the controller controls the N touch signal processing circuits to receive the N touch signals through the N switching circuits from the touch panel and process the N touch signals to obtain the N digital signals.

5. The circuit of claim 3, wherein in an event that the determining result indicates that an i-th touch signal processing circuit of the N touch signal processing circuits is failed, the controller controls the M-th switching circuit of the N switching circuits to connect to an (M+1)-th touch signal processing circuit of the N touch signal processing circuits if M is smaller than N and larger than or equal to i, or controls the M-th switching circuit of the N switching circuits to connect to the M-th of the N touch signal processing circuits if M is smaller than i, and controls the N-th switching circuit of the N switching circuits to connect to the backup processing circuit, and the controller controls the N touch signal processing circuits and the backup processing circuit to receive the N touch signals through the N switching circuits from the touch panel and process the N touch signals to the N digital signals.

6. The circuit of claim 1, wherein each of the N touch signal processing circuits and the backup processing circuit comprise an analog to digital convertor (ADC) and a digital filter.

7. A touch signal processing method, for a circuit used for a touch panel, comprising:

determining whether one of N touch signal processing circuits of the circuit is failed and generating a determining result;

controlling the N touch signal processing circuits and a backup processing circuit of the circuit to process N touch signals received from the touch panel to obtain N digital signals according to the determining result;

in an event that the determining result indicates that an M-th touch signal processing circuit of the N touch signal processing circuits is failed, disabling the M-th touch signal processing circuit of the N touch signal processing circuits and enables the backup processing circuit, and processing, by the backup processing circuit and the N touch signal processing circuits, the N touch signals to the N digital signals;

wherein each of the N touch signal processing circuits and the backup processing circuit are identical circuits.

8. The touch signal processing method of claim 7, further comprising:

in an event that the determining result indicates that the N touch signal processing circuits are not failed, disabling the backup processing circuit and processing, by the N touch signal processing circuits, the N touch signals to obtain the N digital signals.

\* \* \* \* \*